United States Patent [19]

Nakane et al.

[11] Patent Number: 5,006,581
[45] Date of Patent: Apr. 9, 1991

[54] SYNTHETIC RESIN COMPOSITION

[75] Inventors: Toshio Nakane, Fuji; Kenji Hijikata, Mishima; Yukihiko Kageyama, Fuji, all of Japan

[73] Assignee: Polyplastics Co., Ltd., Osaka, Japan

[21] Appl. No.: 130,907

[22] Filed: Dec. 11, 1987

[30] Foreign Application Priority Data

Dec. 26, 1986 [JP] Japan .................... 61-309870

[51] Int. Cl.$^5$ ............................. C08L 83/10
[52] U.S. Cl. .................... 524/266; 524/268; 524/269; 524/462; 525/92; 525/100; 525/101; 525/104; 525/106; 525/391; 525/393; 525/426; 525/431; 525/445; 525/446; 525/453; 525/455; 525/464; 525/474; 525/476; 525/931
[58] Field of Search ............... 525/446, 474, 931, 92, 525/100, 101, 104, 105, 391, 393, 431, 426, 445, 446, 457, 488, 464, 476; 524/266, 268, 265, 462

[56] References Cited

U.S. PATENT DOCUMENTS

| | | | |
|---|---|---|---|
| 3,236,914 | 2/1966 | Murdock et al. | 525/931 X |
| 3,691,257 | 9/1972 | Kendrick et al. | 525/474 |
| 3,701,815 | 10/1972 | Matzner et al. | 525/446 |
| 3,861,915 | 1/1975 | Cawley . | |
| 3,935,154 | 1/1976 | Cawley | 525/474 |
| 3,935,154 | 1/1976 | Cawley . | |
| 3,962,299 | 8/1976 | Stackman | 528/26 |
| 4,024,100 | 5/1977 | Kuhn et al. | 525/474 |
| 4,090,996 | 5/1978 | Gergen et al. | 525/92 |
| 4,348,510 | 9/1982 | Keck et al. | 525/474 |
| 4,505,982 | 3/1985 | Hobeisel | 525/931 X |
| 4,558,096 | 12/1985 | Boon et al. . | |
| 4,616,042 | 10/1986 | Avakian | 521/81 |
| 4,703,075 | 10/1987 | Egami | 524/269 |

FOREIGN PATENT DOCUMENTS 0119150 9/1984 European Pat. Off. .

OTHER PUBLICATIONS

Polymer Handbook, Brandrup et al., 2nd Ed., pp. IV-357 (1975).

Primary Examiner—John C. Bleutge
Assistant Examiner—R. Dean, Jr.
Attorney, Agent, or Firm—Nixon & Vanderhye

[57] ABSTRACT

A synthetic resin composition, having a high toughness and a wear resistance, comprises a synthetic resin with solubility parameter $\delta 9.5$ cal$^{\frac{1}{2}}$ cm$^{31\ 3/2}$ or higher and a modifier with solubility parameter $\delta 8.5$ cal$^{\frac{1}{2}}$cm$^{-3/2}$ or lower and dispersed therein, characterized in that a silicon containing copolyester, being a block copolymer consisting of 1~90% by weight of siloxane segment represented by the undermentioned general formula (A) and 99~1% by weight of polyester segment represented by the undermentioned general formula (B), the degree of polymerization of siloxane segment being 1~2,000, and that of polyester segment 1~1,000, is added to be mixed therewith as a dispersibility improver:

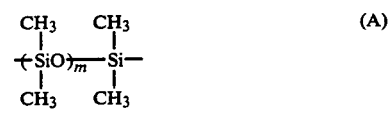

(In this formula, m denotes a number of 1~2,000.)

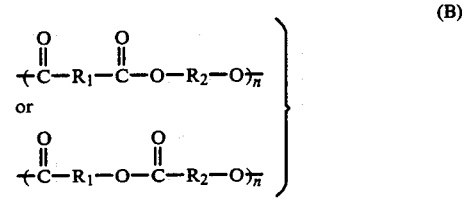

(In this formula, R$_1$ designates one or two or more members selected from among aromatic divalent radicals having 6~12 carbon atoms or aliphatic divalent radicals having 4~20 carbon atoms, and R$_2$ from among aromatic divalent radicals having 6~20 carbon atoms or aliphatic divalent radicals having 2~20 carbon atoms; and n stands for a number of 1~1,000).

7 Claims, No Drawings

SYNTHETIC RESIN COMPOSITION

The present invention relates to a composite synthetic resin composition having high toughness and excellent wear resistance in which a material being a modifier and substantially hardly homogeneously dispersible in a synthetic resin, particularly a thermoplastic resin, is homogeneously dispersed therein by adding and including in the mixture a specified siloxane copolymer as a dispersion improver.

(Prior art)

Aromatic thermoplastic polyesters represented by polyethylene terephthalate and polybutylene terephthalate, thermoplastic polyamides, represented by nylon 6 and nylon 6.6, and other engineering plastics, like polyester amides being their copolymers, etc., are finding a variety of end uses as resins which exhibit excellent tensile strength, tear strength, impact resilience, low temperature resistance, flexural resistance, etc. It has also been proposed to form composite products of these resins by adding various materials thereby achieving modifications and further, high performances. When solid fillers are used various coupling agents are employed for the purpose of improving the affinity of the surface of the filler as a component of the composite product with the matrix resin or for obtaining homogeneous dispersion.

If these modifiers are resin or liquid materials, normally their solubility parameters $\delta$ are different and, therefore, it is often the case that their mutual compatibility is low, resulting in failure to attain the state desired of homogeneous dispersion.

In this situation, the aforementioned coupling agent is not usable, and general sur±ace active agents, lacking in thermal stability, are not suitable for use with resins, the so-called engineering plastics for which processing at high temperatures is indispensable. Particularly, for dispersing oily substances, etc., they cannot be mixed in large amounts; they will separate out and bleed. Even in small amounts, homogeneous dispersions can not be achieved; appearance suffers, physical properties are deflected and mechanical strength tends to decline. And in mutually blending polymers, homogeneous dispersion is hard to achieve similarly as in the dispersion of oily substances, surface stripping phenomenon occurs, or uniformity in the mechanical strength is hard to come by.

With a view to solving these problems, it has been proposed to use a block copolymer having a similar segment as that of the substance to be mixed, or are that makes an ester exchange at the interface between the substances to be mixed as an to attempt in improving the interfacial affinity through their combination. But in these approaches, the substances which may be mutually mixed are limited. It is not applicable to a member of other substances; Thus a need exists which would allow a variety of substances desired to be mixed. Summary of the Invention It is the object of this invention to provide a synthetic resin composition having high toughness and excellent wear resistance which permits the state of homogeneous dispersion to be achieved without causing bleeding, when melting and blending its components, and which suffers no degradation in various mechanical properties.

It has been discussed that the specified siloxane copolymer does not decompose, when used at high temperatures, and that a wide range of substances may to be mixed with it.

In addition, the surface active effect of the siloxane copolymer is such that even if the solubility parameters of such substances differ widely, homogeneous dispersion may be achieved.

Thus the present invention relates to a synthetic resin composition being a composite composition comprising a synthetic resin with its solubility parameter $\delta$ 9.5 cal$^{178}$cm$^{-3/2}$ or higher and a modifier with its solubility parameter $\delta$8.5 cal$^{178}$cm$^{-3/2}$ or lower mixed and dispersed therein, characterized in that a silicon containing copolyester, being a block copolymer consisting of 1~99% by weight of siloxane segment represented by the undermentioned general formula (A) and 99~1% by weight of polyester segment represented by the undermentioned general formula (B), the degree of polymerization of siloxane segment being 1~2,000, and that of polyester segment 1~1,000, is added to be mixed therewith as a dispersibility improver:

(In this formula, m denotes a number of 1~2,000.)

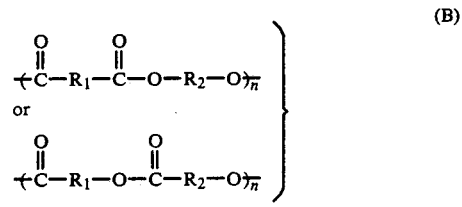

(In this formula, R$_1$ designates one or two or more members of radicals selected from among aromatic divalent radicals having 6~12 carbon atoms or aliphatic divalent radicals having 4~20 carbon atoms, and R$_2$ from among aromatic divalent radicals having 6~20 carbon atoms or aliphatic divalent radicals having 2~20 carbon atoms, and n stands for a numeral of 1~1,000.)

As shown above, the invention composition comprises the synthetic resin, the modifier, both synthetic resin and modifier having been dispersed with each other, and the silicon-containing copolyester. It is preferable that the composition comprises 50 to 99.999 percent by weight of a blend comprising 0.1 to 99.99 percent by weight of the synthetic resin and 99.9 to 0.01 percent by weight of the modifier and 50 to 0.001 percent by weight of the copolyester. The blend may include one comprising 1 wt.% of a polyester and 99 wt.% of polytetrafluoroethylene or polyethylene. 0.1 wt.% of a modifier such as a polyfluoride ethylene and silicone oil is advantageous in the invention. More preferably the composition comprises 70 to 99.99 wt.% of a blend comprising 50 to 99.9 wt.% of the synthetic resin and 50 to 0.1 wt.% of the modifier and 30 to 0.01 wt.% of the copolyester.

In the aforementioned dispersibility improver, as the material compounds necessary for forming the siloxane segment (A), a terminal reactive silicone oil represented by the undermentioned general formula (C) or (D) is suitable:

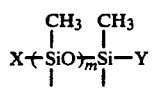 (C)

or

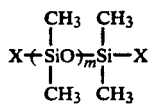 (D)

(X, Y: one or two or more functional groups selected from among —NH$_2$, —OH, —ROH, —Rλ—RCOOH, —RCOOR' and —OR R, R': Hydrocarbons having 1~10 carbon atoms m: a numeral of 1~2,000)

For X and Y, one or two or more functional groups selected from among —NH$_2$, —ROH, —RCOOH which have relatively high reactivity should desirably be employed.

The desirable range of the degree of polymerization (m) of the material (C) or (D) should be 5~500, 10~200 being particularly preferable.

The material compounds for forming the polyester segment represented by the aforementioned general formula (B) consist of monomers capable of forming polyester having an intrinsic viscosity of 1.4 d(/g or lower or its oligomer or ester bonding.

Preferably, R$_1$ in the general formula (B) should be an aromatic divalent radical having 6 carbon atoms, and R$_2$ an aliphatic divalent radical having 2~20 carbon atoms, more preferably R$_2$ in the general formula (B) being an aliphatic divalent radical having 2~4 carbon atoms.

And most preferably, R$_2$ in the general formula (B) should be an aliphatic divalent radical having 4 carbon atoms.

As above described, the polyester segment represented by the general formula (B) is supplied from polymers, oligomers and various monomers which have its skeletons and is copolymerized with the siloxane compound represented by the general formula (C) or (D) at an arbitrary proportion. The polymer used as the material compound should preferably have lower degree of polymerization in view of its reactivity with the siloxane compound, the preferable range of the degree of polymerization being less than 50.

Various monomers are compounds capable of forming ester bonding or their combinations, i.e., one or two or more members of compounds selected from among compounds represented by X'—R$_1$—X', X'—R$_1$—Y', X'—R$_2$—Y and Y'—R$_2$—Y' (where X' denotes —COOH, —COOR', —COCl; and Y', —OH and —O—COR).

As the aforementioned, monomers, a combination of one or two or more members of dibasic acid compounds selected from among terephthalic acid and its delivatives, isophthalic acid and its delivatives, aliphatic dicarboxylic acids having 4~12 carbon atoms and their delivatives, and one or two or more members of diol compounds selected from among bisphenol having 20 or less carbon atoms and its delivatives and aliphatic glycol having 6 or less carbon atoms and its delivatives may be mentioned.

Preferred examples of these monomers are terephthalic acid and its delivatives and aliphatic glycol having 2~4 carbon atoms.

Derivatives herein mentioned signify compounds having reactivity equivalent or analogous to basic compounds, including, e.g., hydroxyesters of carboxylic acids, acid chlorides and compounds having such substituents as halogen, methoxy, alkyl, allyl, etc., attached to the basic compounds.

The proportion of the segment represented by the general formula (A) in the copolymer should be more than 1% by weight but less than 99% by weight, preferably, more than 5% by weight but less than 75% by weight.

In such silicon containing copolymers, the degree of polymerization of siloxane segment (A) is normally from 1 to 2,000, preferably from 5 to 500; and that of polyester segment (B) from 1 to 1,000, preferably, from 1 to 50.

These block copolymer may be manufactured by the hitherto well-known polycondensation process as well as by ester exchange process.

The manufacturing methods may be roughly divided into the reaction of the compound of the general formula (C) or (D) with the monomer to form ester bonding and the reaction of the compound of the general formula (C) or (D) with polyester or its prepolymer or oligomer. In a method mentioned as an example of the former, terminal reactive silicon oil (C) or (D) is added to terephthalic acid or its delivatives and alkylene glycol, etc., the mixture is, then, heated to about 150 to 260° C in the presence of a catalyzer, to perform esterification or ester exchange reaction, etc., and, thereafter, polycondensation is carried out by distilling off excess monomer or removed components under reduced pressure, thereby yielding the block copolymer. In a method mentioned as the latter example, a compound of the general formula (C) or (D) is added to polyalkylene terephthalate prepolymer, etc., which is prepared beforehand, the mixture is, then, heated to from about 200 to 280° C in the presence or absence of a catalyzer to combine the terminal functional groups or the functional groups produced by decomposition of the prepolymer with the reactive groups of the compound of the general formula (C) or (D), thereby yielding the block copolymer. Such other methods may be mentioned.

As a scale for evaluating the compatibility of polymers, etc.( solubility parameter δ is widely employed, details of which appear generally in published books (e.g., Polymer Handbook 2nd Ed. IV-p. 349, etc.)

As is well known, δ designates cohesion between molecules of the same type. In a mixture system satisfying the relation of $$|\delta_1 \delta_2| \approx 0(1)$$

($\delta_1$ and $\delta_2$ are solubility parameters of different substances swelling or dissolution takes place, when high and low molecular compounds are combined, but mechanical mixing and dispersion are stably maintained, when two high molecular compounds are combined. In both cases, affinity is strong and phase separation phenomenon is hard to occur. If the value of the formula (1) exceeds 1, normally phase separation phenomenon takes place, thus making difficult to have homogeneous dispersion in stable form.

This invention has as its object effectively making homogeneous dispersion of more than two component, one component having δ higher than 9.5 cal$^{\frac{1}{2}}$cm$^{-3/2}$, and the other δ lower than 8.5 and which is substantially hard to homogeneously disperse therein.

Components having δ higher than 9.5 cal$^{\frac{1}{2}}$cm$^{-3/2}$ which are used according to this invention include, e.g., one or two or more members of thermoplastic resins selected from among polyester, polyamide, polyester amide, polyurethane, polyvinyl chloride, polycarbonate, polyvinylidene chloride, polyacrylonitrile, polyacetal, polymethacryl nitrile, polymethyl acrylate, polyvinyl alcohol, cellulose and their delivatives or thermosetting resins selected from among urea resin, melamine resin, epoxy resin, phenol resin and their derivatives.

More preferably, they should be polyester, polyamide, polyester amide and polyurethane.

And most preferably, they should be aromatic dicarboxylic acids or their alkyl esters and aliphatic glycol having 2~10 carbon atoms, among the aromatic dicarboxylic acids used as the materials being terephthalic acid, isophthalic acid, phthalic acid, naphthalene dicarboxylic acid, diphenyl ether dicarboxylic acid, diphenyl dicarboxylic acid, diphenyl sulfon dicarboxylic acid and diphenoxy ethane dicarboxylic acid.

Mentioned as diol components are polymethylene-α, ω-diols, e.g., ethylene glycol, 1,3 propane diol, 1,4-butane diol, diethylene glycol and triethylene glycol, etc.

Modifiers with δ lower than 8.5 cal$^{\frac{1}{2}}$cm$^{-3/2}$ include one or two or more members of homopolymers selected from among polytetrafluoroethylene, polychlorotrifluoroethylene, fluorine rubber, polydimethyl silicone, polydimethyl siloxane, silicone rubber, polyisobutylene, polyethylene, ethylene propylene rubber and polypropylene and/or copolymers having as their component(s) at least one member of monomer units which are forming these polymers, preferably, fluorine oil or silicone oil having molecular weights 200,000 or less or mineral oils.

The resin compositions of this invention may be homogeneously mixed and dispersed by equipment used for dissolution and kneading of common thermoplastic resins, for example, an extruder, etc., or may be readily molded by the usual method with a molding machine.

(Effect of this invention)

In the composition of this invention, a synthetic resin which is originally hard to disperse and the other substance, these two components differing in δ (cal$^{\frac{1}{2}}$cm$^{-3/2}$), are homogeneously dispersed, with a specified siloxane copolymer added to be included in the mixture; dispersion of compounds with 8.5 cal$^{\frac{1}{2}}$cm$^{-3/2}$ or lower which are substantially incompatible with the base polymer is very good, with bleeding during or after the molding preventable. Further, in the molds, no stripping phenomenon of the interface takes place, so that high toughness and excellent wear resistance may be provided. The thermoplastic resin compositions of this invention, because of their excellent characteristics, are finding various uses, preferred examples including various structural materials like automobile's outer plate, for which physical and mechanical properties like impact resistance are required, and precision machinery parts, electrical parts, etc., like key tops, gears, etc., for which high wear resistance and sliding resistance are required.

(Preferred embodiments)

In the following, this invention is described in connection with its preferred embodiments. First, reference examples of a manufacturing method of polymer containing siloxane segment are described.

Reference example (A)

After adding a specified amount of an ester exchange catalyzer and a polycondensation catalyzer to 194 parts by weight of dimethyl terephthalate, 200 parts by weight of 1,4-butane diol and 200 parts by weight of silicone oil F99-258 having hydroxyl groups on both ends (product of Nippon Yunichika Co., Ltd.), ester exchange reaction was conducted, while distilling off out of the reaction system methanol which has been produced as a byproduct under heating. Further, the temperature was raised stepwise under reduced pressure, finally achieving polycondensation at 270° C and under 1 torr. The copolymer thus obtained was hard to dissolve in common solvents for RBT or common solvents for silicone oil. The composition of the copolyester determined by NMR analysis gave PBT component at 90% by weight and silanol component 10% by weight and the melting point was 224° C.

Reference example (B)

Ester exchange and polycondensation were performed similarly as in Reference example (A), with a specified amount of a catalyzer added to 200 parts by weight of terephthalic acid dichloride, 90 part by weight of 1,4-butane diol and 27 parts by weight of Silicon Oil XX22-161AS having amine groups in both terminals (a product of Shinetsu Chemical Industries Co., Ltd.). The copolymer obtained had 90% by weight of PBT component and 10% by weight of siloxane component and its melting point was 224° C.

Reference example (C)

One hundred parts by weight of silicone oil used in Reference example (B) was added to 200 parts by weight of polybutylene terephthalate (PBT) with number average molecular weight 16,000 and the mixture was heated at 260° C under reduced pressure, yielding a block copolymer in which the component ratio of PBT to siloxane was 75/25 (ratio by weight). Its melting point was 218° C.

Example 1

To 91.6% by weight of polybutylene terephthalate (Duranex 2002, manufactured by Polyplastics Company), 8% by weight of silicone oil (SH-200, manufactured by Toray Silicone Company) and 0.4% by weight of siloxane copolymer obtained in reference examples (A)~(C) were added and the mixture was mixed and kneaded in a Labo Plastomill at 240° C for 5 min, followed by freezing in liquid nitrogen and pulverization. The fracture of the resin composition thus obtained, as observed under a scanning type electron microscope, showed homogeneous dispersion of silicone oil. The coefficient of dynamic friction of this resin composition was measured by the method of ASTM D1894. Bending of a test piece of 100×25mm and 3 mm thick to an angle of 180° C at a bending radius of 1 mm in ID in accordance with JIS Z-2248 was repeated at room temperature. No stripping of flexed surface was recognized after bending 24 times. The oil was extracted from similar test pieces with acetone for 1 hr at room temperature. The results are put up in Table 1.

Examples 2 and 3

Under the similar conditions as in Example 1, fluorine oil in place of silicone oil and polytetrafluoroethylen (PTFE) were mixed and kneaded. Results are respectively shown in Table 1.

Comparative examples 1 and 2

Blend systems same as those of Examples 1 and 3 but to which the siloxane copolymer was not added are given as Comparative examples 1 and 2 (Table 1).

Examples 4~6 and Comparative example 3

In Example 4~6 and comparative example 3, the effects of block copolymer were examined, when polyamide was used as the base polymer (Table 1).

Example 7 and Comparative example 4

23.7% by weight of epoxy resin setting agent (Tohmide #255, manufactured by Fuji Kasei) and 0.4% by weight of siloxane copolymer of Reference example (C) were melted by heating beforehand to have homogeneous dispersion; then, after leaving it to cool down, 67.9% by weight of epoxy resin (Epicoat #828, manufactured by Yuka Shell Company) and 8% by weight of silicone oil (Silicone Oil SH-200, manufactured by Toray Silicone Company) were added and well mixed therewith and, subsequently, the mixture was molded and set at 100° C. for 3 hr. The characteristic values of the set product are also given in Table 1.

The epoxy resin was set under similar conditions as in Example 7, except that no siloxane copolymer was added and its characteristic values were examined (Table 1).

In all cases, the ratio of oil or fluorine resin to base polymer and the amount of siloxane base copolymer added were similar as in Example 1.

The results of bending property were evaluated in terms of undermentioned three scores taken by visual observation of the state of layer stripping of the bent surface:

○ : No stripping layer appears on the surface.

Δ: The surface is stripped, with cracking recognizable.

X : The test piece has been fractured or partly fractured within 24 cycles of bending test.

TABLE 1

Examples and Comparative examples
Numerals in ( ) designate parts by weight

| | | | Type of siloxane copolymer (Reference examples) | Dynamic friction coefficient | Bending test | Amount of oil extracted by solvent (%) |
|---|---|---|---|---|---|---|
| Example 1 | P B T (91.6) | Silicone oil (8) | (A) (0.4) | 0.13 | ○ | 0.7 |
| | (91.6) | (8) | (B) (0.4) | 0.14 | ○ | 0.8 |
| | (91.6) | (8) | (C) (0.4) | 0.13 | ○ | 0.7 |
| Comparative example 1 | P B T (91.6) | Silicone oil (8.4) | — | 0.17 | X | 27.4 |
| Example 2 | P B T (91.6) | Fluorine oil (8) | (C) (0.4) | 0.12 | ○ | 1.1 |
| Example 3 | P B T (91.6) | P T F E (8) | (C) (0.4) | 0.14 | Δ | — |
| Comparative example 2 | P B T (91.6) | P T F E (8.4) | — | 0.17 | X | — |
| Example 4 | P A (91.6) | Silicone oil (8) | (C) (0.4) | 0.14 | ○ | 1.2 |
| Example 5 | P A (91.6) | Fluorine oil (8) | (C) (0.4) | 0.14 | ○ | 1.2 |
| Example 6 | P A (91.6) | P T F E (8) | (C) (0.4) | 0.15 | Δ | — |
| Comparative example 3 | P A (91.6) | Silicone oil (8.4) | — | 0.18 | X | 43.3 |
| Example 7 | Epicoat 8 2 8 (67.9) Tohmide 2 5 5 (23.7) Silicone oil (8) | | (C) (0.4) | 0.18 | Δ | 0.9 |
| Comparative example 4 | Epicoat 8 2 8 (67.9) Tohmide 2 5 5 (23.7) Silicone oil (8) | | — | 0.24 | X | 17.9 |

What is claimed is:

1. A synthetic resin composition which comprises a resin dispersion of a synthetic resin having a solubility parameter of 9.5 cal$^{\frac{1}{2}}$cm$^{-3/2}$ or higher, a modifier having a solubility parameter of 8.5 cal$^{\frac{1}{2}}$cm$^{-3/2}$ or lower, and a silicon-containing copolyester being a block copolymer consisting of (a) 1 to 90% by weight of siloxane segment

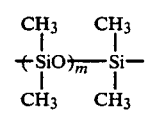

wherein m is a number between 1 and 2,000, and (b) 99 to 1% by weight of polyester segment represented by the following formula:

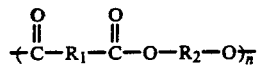

or

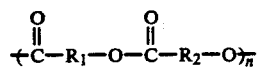

wherein n is a number between 1 to 1,000, $R_1$ is selected from aromatic divalent radicals having 6 to 12 carbon atoms, or aliphatic divalent radicals having 4 to 20 carbon atoms, and $R_2$ is selected from divalent radical shaving 6 to 20 carbon atoms, or aliphatic divalent radicals having 2 to 20 carbon atoms, and wherein
the degree of polymerization of the siloxane segment and the polyester segment is 1 to 2,000 and 1 to 1,000 respectively.

2. A synthetic resin composition as in claim 1, wherein the synthetic resin contains at least one thermoplastic or thermosetting resin.

3. A synthetic resin composition as in claim 2, wherein said thermoplastic resin is at least one selected from the group consisting of polyester, polyamide, polyester amide, polyurethane, polyvinyl chloride, polycarbonate, polyacetal, polyvinylidene chloride, polyacrylonitrile, polymethacrylonitrile, polymethyl acrylate, polyvinyl alcohol, and cellulose, and wherein said thermosetting resin is at least one selected from the group consisting of urea resin, epoxy resin, and phenol resin.

4. The synthetic resin composition as in claim 2, wherein sia dsynthetic resin is selected from polyester and polyamide resins.

5. The synthetic resin composition as in claim 4, wherein the polyester resin is polyalkylene terephathalate havin an aliphatic alkylene chang of 2 to 4 carbon atoms.

6. The synthetic resin composition as inc laim 1, wherein the modifier is selected from homopolymers or copolymers of polytetrafluoroethylene, polychlorotrifluoroethylene, polydimethyl silicone polyisobutylene, polyethylene, and polypropylene.

7. The synthetic resin composition as in claim 1, wherein the modifier is mineral oil.

* * * * *

UNITED STATES PATENT AND TRADEMARK OFFICE
CERTIFICATE OF CORRECTION

PATENT NO. : 5,006,581

DATED : April 9, 1991

INVENTOR(S) : NAKANE et al

It is certified that error appears in the above-identified patent and that said Letters Patent is hereby corrected as shown below:

Title Page:
Under "Abstract", line 3, change $cm^{-31\ 3/2}$ to --$cm^{-3/2}$--;
line 13, delete "added to be".

Column 1, line 24, after "further" delete the comma (,);
line 25, after "used" insert a comma (,);
line 33, after "attain" delete "the state de-" and insert --a--;
line 34, delete "sired of";
line 36, delete "sur±ace" and insert --surface-- after "general";
line 42, after "dispersions" change "can not" to --cannot--;
line 44, change "deflected" to --defective--;
line 49, delete "come by" and insert --achieve--;
line 52, after "or" delete "are" and insert --one--;
line 57, after "a" delete "member" and insert --number--;
line 58, after "substances" delete the semi-colon (;) and insert a period (.);
line 63, after "permits" delete "the" and isnert --a--;
line 64, after "without" delete "causing";
line 67, after "been" delete "discussed" and insert --discovered--.

Column 2, line 1, after "may" delete "to";
line 10, delete "$cal^{173}$" and insert --$cal^{1/2}$--;
line 11, delete "$cal^{178}$" and insert --$cal^{1/2}$--.

Column 3, line 30, delete "d(/g" and insert --dl/g--;
line 48, after "have" insert --a--;
line 67, after "its" delete "delivatives" and insert --derivatives--.

UNITED STATES PATENT AND TRADEMARK OFFICE
CERTIFICATE OF CORRECTION

PATENT NO. : 5,006,581

DATED : April 9, 1991

INVENTOR(S) : NAKANE et al

It is certified that error appears in the above-identified patent and that said Letters Patent is hereby corrected as shown below:

Column 4, line 2, after "its" delete "delivatives" and insert --derivatives--;
line 30, after "its" delete "delivatives" and insert --derivatives--;
line 40, after "is" delete "," and after "then" delete ",".

Column 5, line 2, after "two" delete "component" and insert --components--;
line 5, delete "hard to" and insert --difficult--;
line 45, after "by" delete "the" and after "usual" change "method" to --methods--.

Column 10, claim 4, line 2, change "sia dsynthetic" to --said synthetic--;
claim 5, line 3, after "alkylene" delete "chang" and insert --chain-- and after "late" delete "havin" and insert --having--.

Signed and Sealed this

Fourteenth Day of July, 1992

Attest:

DOUGLAS B. COMER

Attesting Officer

Acting Commissioner of Patents and Trademarks